United States Patent
Kraeuter et al.

(10) Patent No.: US 9,500,351 B2
(45) Date of Patent: Nov. 22, 2016

(54) LIGHTING UNIT HAVING A PLURALITY OF LIGHT EMITTING DIODES

(71) Applicant: OSRAM GmbH, Munich (DE)

(72) Inventors: Gertrud Kraeuter, Regensburg (DE); Bernd Barchmann, Regensburg (DE); Andreas Dobner, Wenzenbach (DE); Florian Boesl, Regensburg (DE)

(73) Assignee: OSRAM GMBH, Munich (DE)

( * ) Notice: Subject to any disclaimer, the term of this patent is extended or adjusted under 35 U.S.C. 154(b) by 8 days.

(21) Appl. No.: 14/621,410

(22) Filed: Feb. 13, 2015

(65) Prior Publication Data

US 2015/0233561 A1    Aug. 20, 2015

(30) Foreign Application Priority Data

Feb. 14, 2014   (DE) ......................... 10 2014 202 761

(51) Int. Cl.
| | |
|---|---|
| *F21S 4/00* | (2016.01) |
| *F21V 23/00* | (2015.01) |
| *F21K 99/00* | (2016.01) |
| *F21V 29/70* | (2015.01) |
| *B33Y 80/00* | (2015.01) |
| B33Y 10/00 | (2015.01) |
| F21V 23/06 | (2006.01) |
| F21Y 101/02 | (2006.01) |
| F21Y 111/00 | (2016.01) |

(Continued)

(52) U.S. Cl.
CPC .............. *F21V 23/005* (2013.01); *B33Y 80/00* (2014.12); *F21K 9/135* (2013.01); *F21V 29/70* (2015.01); *B29L 2031/06* (2013.01); *B33Y 10/00* (2014.12); *F21V 23/003* (2013.01); *F21V 23/06* (2013.01); *F21V 29/58* (2015.01); *F21Y 2101/02* (2013.01); *F21Y 2111/004* (2013.01); *Y10T 29/49826* (2015.01)

(58) Field of Classification Search
CPC .. F21V 23/004; F21V 23/005; F21V 23/009; F21V 29/58; F21V 23/003; F21V 23/008; F21V 23/00; F21V 21/00; F21V 3/00; F21V 23/002; F21V 23/006; F21V 29/56; F21V 29/70; F21V 29/87; F21V 3/02; F21Y 2111/004; F21Y 2103/003; F21Y 2105/001; F21Y 2111/005; F21Y 2111/001; H01J 1/02; F21S 10/06; F21W 2111/00; F21W 2121/00; F21K 9/135
See application file for complete search history.

(56) References Cited

U.S. PATENT DOCUMENTS

| | | |
|---|---|---|
| 5,585,783 A | 12/1996 | Hall |
| 5,890,794 A | 4/1999 | Abtahi et al. |

(Continued)

FOREIGN PATENT DOCUMENTS

| | | |
|---|---|---|
| DE | 299 23 899 U1 | 6/2001 |
| WO | 02/052190 A1 | 7/2002 |

OTHER PUBLICATIONS

Search Report issued in the corresponding German application No. 10 2014 202 761.6 mailed on Oct. 30, 2014 (7 pages).

*Primary Examiner* — Hargobind S Sawhney
(74) *Attorney, Agent, or Firm* — Viering, Jentschura & Partner mbB

(57) ABSTRACT

In various embodiments, a lighting unit is provided. The lighting unit may include a hollow body made of a plastics material as a substrate, which hollow body has an outer surface and an opposite inner surface, wherein the latter at least partially delimits a hollow body internal volume, a plurality of light emitting diodes, which are arranged on the outer surface of the hollow body, and a conductor track structure, which is electrically conductively connected to the light emitting diodes. The conductor track structure is arranged on the inner surface of the hollow body, and the electrically conductive connection to the light emitting diodes is produced by through-contacts, which are passed through the plastics material.

18 Claims, 2 Drawing Sheets

(51) Int. Cl.
*F21V 29/58* (2015.01)
*B29L 31/06* (2006.01)

(56) References Cited

U.S. PATENT DOCUMENTS

| | | | |
|---|---|---|---|
| 7,736,020 B2* | 6/2010 | Baroky | F21K 9/135 362/245 |
| 8,540,414 B2* | 9/2013 | Hu | F21K 9/1355 362/640 |
| 2002/0153835 A1* | 10/2002 | Fujiwara | H01L 33/508 313/512 |
| 2009/0200939 A1* | 8/2009 | Lenk | F21K 9/135 313/512 |
| 2011/0101842 A1* | 5/2011 | Valenzano | F21V 19/005 313/46 |
| 2011/0254423 A1 | 10/2011 | Lee | |
| 2013/0201682 A1* | 8/2013 | Chiu | F21V 29/20 362/235 |

* cited by examiner

US 9,500,351 B2

LIGHTING UNIT HAVING A PLURALITY OF LIGHT EMITTING DIODES

CROSS-REFERENCE TO RELATED APPLICATION

This application claims priority to German Patent Application Serial No. 10 2014 202 761.6, which was filed Feb. 14, 2014, and is incorporated herein by reference in its entirety.

TECHNICAL FIELD

Various embodiments relate generally to a lighting unit having a plurality of light emitting diodes (LEDs) which are arranged on a substrate.

BACKGROUND

Within the meaning of the present disclosure, a "lighting unit" may be, for example, a light-emitting means provided with a plurality of light emitting diodes (LEDs), which light-emitting means, when equipped with a base, can be inserted into a luminaire. The light-emitting means can be used, for example, as a replacement for an incandescent lamp and can be characterized by a lower energy consumption during operation and a longer life in comparison with said incandescent lamp.

SUMMARY

In various embodiments, a lighting unit is provided. The lighting unit may include a hollow body made of a plastics material as a substrate, which hollow body has an outer surface and an opposite inner surface, wherein the latter at least partially delimits a hollow body internal volume, a plurality of light emitting diodes, which are arranged on the outer surface of the hollow body, and a conductor track structure, which is electrically conductively connected to the light emitting diodes. The conductor track structure is arranged on the inner surface of the hollow body, and the electrically conductive connection to the light emitting diodes is produced by through-contacts, which are passed through the plastics material.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 2:
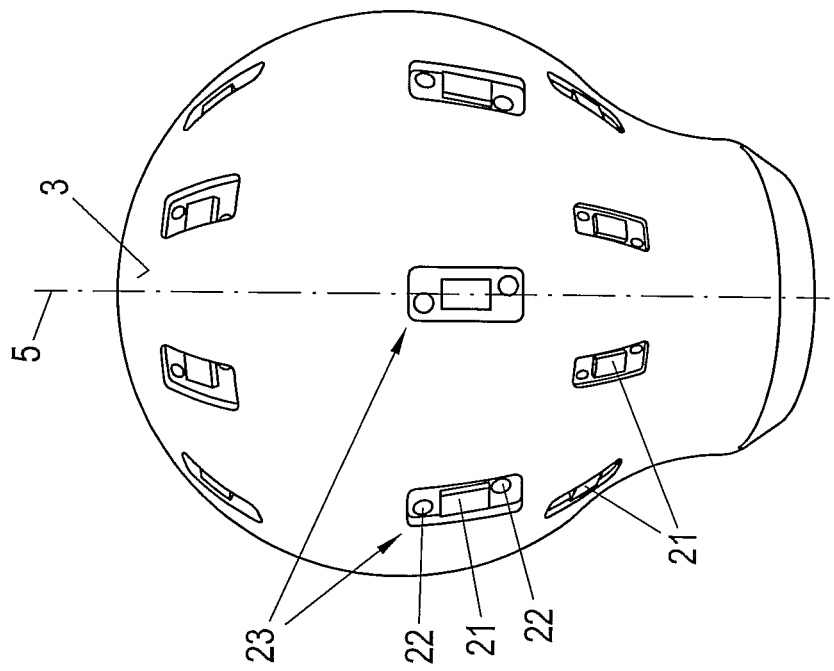
FIG. 2 shows a view of the outer surface, opposite the inner surface, of the hollow body half shown in FIG. 1.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various embodiments specify a particularly advantageous lighting unit including a plurality of light emitting diodes (LEDs) and an advantageous method for producing the lighting unit.

Various embodiments provide a lighting unit including a hollow body made of a plastics material as a substrate, which hollow body has an outer surface and an opposite inner surface. The latter at least partially delimits a hollow body internal volume, a plurality of LEDs, which are arranged on the outer surface of the hollow body. The lighting unit further includes a conductor track structure, which is electrically conductively connected to the LEDs. The conductor track structure is arranged on the inner surface of the hollow body, and the electrically conductive connection to the LEDs is produced by through-contacts, which are passed through the plastics material.

Therefore, a hollow body with correspondingly an inner surface which is opposite the outer surface provided with the LEDs and carries the conductor track structure acts as substrate. The hollow body is provided from a plastics material because such a material can be shaped easily as described in detail below, which is of particular interest also in respect of mass production.

The substrate may be in the form of a hollow body, i.e. the outer surface is in any case sectionally convex and the inner surface is in any case sectionally concave. With the at least partial convexity of the outer surface, the LEDs may now firstly be arranged such that the respectively emitted beams diverge with respect to one another, which may enable an emission characteristic with a large angle, as will be explained in detail below.

Secondly, the conductor track structure used for the electrical supply is arranged on the inner surface, i.e. facing away from the lighting application, which can also be of interest in respect of light emission. The outer surface can be diffusively reflective, for example, and this surface property is then not impaired by the conductor track structure. In addition, the conductor track structure on the inner surface is also well protected, for example from mechanical action during replacement of the lighting unit, for example when the outer surface is handled during screwing or plugging into a luminaire.

Even when, in various embodiments, the hollow body internal volume is open towards one side, when considered individually, i.e. on the basis of the hollow body alone, the internal volume may then nevertheless be closed off, when considering the lighting unit as a whole, e.g. by a base element. The conductor track structure may therefore also be well protected from environmental influences on the inner surface, and it may be possible to dispense with a passivation layer (with a thickness generally in the region of the conductor track thickness, for example of at most 30 µm, 20 µm or 10 µm) which covers the conductor track structure.

The "plurality" of LEDs should be interpreted as meaning at least two LEDs; in total also a large number of LEDs can be provided, for example at least three, five, seven, nine or ten LEDs. In this case, generally not all LEDs of the lighting unit need to be connected to the conductor track structure on the inner surface, but this may be the case. The conductor track structure on the inner surface can connect the plurality of LEDs to one another, for example connect them in series, wherein the LEDs, also divided into a plurality of groups, can be connected to one another in each case (each group). The latter may provide advantages, for example, in respect of circuitry, for example when the lighting unit is operated on a mains voltage.

A conductor track which is electrically conductively connected to the LED by one of the through-contacts, is assigned to an LED, e.g. each LED, on the inner surface. "Conductor track structure" therefore relates to a large number of conductor tracks. Although the "through-contact" could generally also be produced by local doping of the plastics material with electrically conductive filler particles, for example, it may be a through-hole between the inner surface and the outer surface which is filled with a metalloconductive material, e.g. a metal.

The LEDs may be each arranged on the outer surface so as to bear flat thereon, e.g. in planar fashion, which is not intended to mean that the respective LED needs to rest directly on the outer surface itself. Rather, it may be connected thereto via a flat layer (or connected thereon via a contact point; see below), for example via a joining connection layer, for example a solder layer or adhesive layer. In various embodiments, such a connecting layer is comparatively thin, i.e. is provided with a thickness of no more than 200 µm, 150 µm or 100 µm, with increasing preference in this order, for example.

In general, "LED" can also mean an LED chip which is not individually housed; for example, the "LEDs" are each individually housed component parts which are arranged on the hollow body.

"Plastics material" can be, for example, polypropylene (PP, e.g. crosslinked by irradiation), polyamide (for example PA6, PA66, PA10, PA11, PA12), e.g. polyamide with high temperature stability, such as PPA or PA46, polyester (for example PBT, PET, PBT/PET, PCT, ABS, ABS/PC), polyphenylene sulfide, LCP and/or PEEK.

The inner surface delimits the hollow body internal volume at least partially, i.e. it can also be open (e.g. it is open at precisely one point). In any case regionally, one point on the inner surface should have another point on the inner surface opposite it (spaced apart with respect thereto via the hollow body internal volume); in other words, if a normal is laid at a starting point on the inner surface, this normal then also intersects another point on the inner surface. Since the hollow body internal volume is open in various embodiments, this does not necessarily apply to the entire inner surface because a region of the inner surface can be opposite the opening (cf. FIG. 1). The "inner surface normal condition" should e.g. be met, however, for at least 30%, 40%, 50%, 60% or 70% of the inner surface (i.e. for the starting points lying in the corresponding area).

The outer surface of the hollow body faces the volume which is illuminated by the lighting unit during operation, i.e. the lighting application. In various embodiments, light emitted by the lighting unit is also regionally incident on the outer surface, for example on at least 30%, 50% or 70% thereof (and on at most 90%, for example). In various embodiments, none of the light emitted by the lighting unit is incident on the inner surface. Even when the outer surface "faces" the lighting application, this generally does not rule out the presence of an enveloping body around the hollow body. Therefore, for example, a coating could be applied or the hollow body could be arranged in a e.g. diffusely scattering enveloping body (with its outer surface spaced apart from the inner surface of the envelope); both a diffusely scattering coating and a corresponding envelope can be used for homogenization of the light emitted in punctiform fashion by the individual LEDs to this extent.

Secondly, the outer surface of the hollow body in various embodiments can also represent the outer surface of the lighting unit, which may be of interest, for example, in respect of an overall simplified design and a therefore inexpensive production.

Although the substrate body provided from the plastics material is hollow when considered individually, the hollow body internal volume in an exemplary configuration can nevertheless be occupied, for example populated with control/driver electronics and/or filled with a filler material (see in detail below).

Various embodiments are given in the dependent claims and the description below, in which furthermore no specific distinction is drawn below between apparatus and method aspects, e.g. relating to production, and uses of the lighting unit in the illustration; in any case the disclosure in respect of all of the categories of the claims should be interpreted as implicit.

In various embodiments, a region of the outer surface is provided as arrangement region, which is inwardly lowered in comparison with a region of the outer surface which surrounds said arrangement region, i.e. in the direction of the hollow body internal volume. Then, an LED, e.g. precisely one LED, is arranged in the arrangement region, correspondingly also lowered a little.

Also with a view to the e.g. planar bearing arrangement of the LED, the arrangement region can be divided into a basic area which is in itself planar and a flank which connects this basic area to the outer surface region ("surrounding region") surrounding said basic area. The basic area can be lowered, for example, by at least $1/40$, $1/35$, $1/30$, $1/25$, $1/20$ or $1/15$ of the average value from its smallest and greatest extent, with increasing preference in this order, to be precise in comparison with the surrounding region with respect to a normal direction (of a normal on the basic area).

The surrounding region has an inner boundary (proximal to the LED) and an outer boundary (distal to the LED). An upper edge of the abovementioned flank can mark the inner boundary, for example, which upper edge can also be rounded, e.g. in the context of what is technically conventional; the upper edge marks a transition between a region with a greater gradient (of the flank) and the surrounding region with an at least smaller (or no or negative) gradient relative to the basic area.

The surrounding region should have, by definition, an extent from its inner boundary up to its outer boundary, for example, which corresponds to half the abovementioned average extent of the basic area.

In a configuration, at least one of the through-contacts is provided in the arrangement region; for example, at least two of the through-contacts are provided in the arrangement region, e.g. precisely two through-contacts. "In" the arrangement region means in the lowered region thereof; in the case of the design just described, the through-contact therefore passes through the basic area.

The LED may be protected to a certain extent in the lowered arrangement region, e.g. a rear connection region opposite the light exit surface. If the through-contact is now also positioned in the arrangement region, then ideally no conductor track needs to be routed on the outer surface outside the arrangement region for the electrical connection between the through-contact and the LED, which can in turn avoid damage as a result of mechanical action, for example.

In a configuration, each of the plurality of LEDs is arranged in an arrangement region; this may apply for all LEDs in the lighting unit. In this case, in each case one dedicated arrangement region may be provided for each of the LEDs, wherein in each case at least two, e.g. precisely two, through-contacts are provided in each arrangement region, for example in each case one anode contact and one cathode contact for the respective LED.

The lighting unit can then be configured in such a way that the outer surface, apart from the arrangement regions, is free of conductor tracks, i.e. no conductor tracks extend on the outer surface outside the arrangement regions. As previously mentioned, this can help avoid mechanical damage, for example, or offer effects in respect of reflection properties.

In general, a respective LED is not necessarily placed directly on the through-contact, but rather a contact point can be provided by metallization in the arrangement region, e.g. on an abovementioned basic area thereof, for example. This can be performed, for example, in a method described below for the application of the conductor track structure to the inner surface. Based on the areal directions (of the basic area), the contact point can have, for example, an areal extent which is at least 5, 7, 9 or 10 times greater than that of the corresponding through-contact, which may simplify arrangement and electrical connection of the LED during fitting. In various embodiments, the LED is conductively connected to the contact point over a large area, for example via a joining layer, e.g. an (electrically conductive) adhesive layer or solder layer.

In a configuration, the LED is a Surface Mounted Device, i.e. an SMD component part. This can provide effects, for example, owing to a construction height which is then comparatively low, with the result that the LED provided in the arrangement region can also be lowered completely with respect to the surrounding region, i.e. does not protrude beyond the flank.

If, in a configuration, the arrangement region is filled with a filler material, for example with silicone, the filler material may completely cover the LED, i.e. together with the hollow body (and possibly contact points) completely surround the LED. Thus, for example, an overall comparatively smooth surface can also be achieved, with the result that, therefore, the outer shape of the lighting unit does not have any local elevations/depressions because the lowered portions in the hollow body are filled so as to be flat.

The filing of the arrangement region with filler material can also provide effects, however, if only one side wall region of the LED is covered with the filler material because it is thus possible, for example, for an abovementioned electrically conductive connecting layer on the lower side of the LED to be protected from environmental influences.

In a configuration, particles can be embedded in the plastics material of the hollow body, i.e. randomly distributed therein. Firstly, for example, an additive can be added in order to adjust the optical reflection properties of the outer surface; although in general to this extent targetably absorbent or directionally reflective properties are also conceivable, the additive is preferably selected such that the outer surface is diffusely reflective. In various embodiments, a color pigment, for example titanium dioxide particles, is embedded in the substrate body.

A diffusively reflective outer surface, i.e. in any case a corresponding region thereof (at least 50% or 75%), may generally be provided, i.e. also independently of embedded particles, for example adjusted by a coating. "Diffusively reflective" can generally also mean a directionally diffuse (specularly diffuse) reflection, but e.g. relates to a uniformly diffuse reflection. In the visible range of the spectrum, the reflectivity can to this extent be, for example, at least 30%, 40%, 50%, 60%, 70%, 80% or 90% with increasing preference in this order (which particularly preferably relates to a uniform diffuse reflection); possible upper limits can (independently of this) be for example 99%, 97% or 95%.

Moreover, an additive can additionally or else independently thereof also perform other functions, i.e., for example, an additive can (also) be provided for increasing the thermal conductivity of the hollow body, for example particles consisting of an electrically nonconductive ceramic. For example, particles which include BN, AlN, $Al_2O_3$ and/or SiC, or particles consisting purely thereof can be embedded in the hollow body. Thus, the thermal conductivity of the hollow body can be increased in comparison to that of the plastics material and can be, for example, at least 2 W/(mK), 4 W/(mK), 6 W/(mK), 8 W/(mK) or 10 W/(mK), with increasing preference in this order. In various embodiments, it is then possible to dispense with a separate heat sink, for example, which can simplify design and production.

In addition, an additive can also be provided for increasing the strength of the hollow body (in addition to increasing the reflectivity and/or conductivity or else independently thereof), which can increase the freedom during shaping, in particular in respect of minimum thicknesses. Therefore, for example, fibers can be embedded in the hollow body, for example glass fibers and/or a mineral filler.

Various embodiments relate to a hollow body which is rotationally symmetrical about an axis of symmetry, i.e. a body of revolution, which can convert itself by rotation about any desired angle (about the axis of symmetry). The hollow body can be tubular, for example (with open or closed ends), and the lighting unit can be provided, for example, as light-emitting means for replacing a fluorescent tube (for example T4, T5 or T8).

In various embodiments, the body of revolution is provided, however, such that its outer surface has a shape which is based on that of an envelope of an incandescent lamp, for example an incandescent lamp with an E27 base (and possibly a power of 60 W). When viewed in a sectional plane containing the axis of symmetry, this hollow body should therefore have a closed, spherical end, which is adjoined by a neck section which is tapered with respect to the sphere. A distance taken perpendicularly away from the axis of symmetry up to the outer surface is at a maximum in the sphere section, and a correspondingly taken distance in the neck section can be, for example, at most 85% or 80% of the maximum distance and at least 40%, 50% or 60% thereof. A length of this hollow body taken along the axis of symmetry can correspond, for example, at least to 2 times or 2.5 times said maximum distance and (independently thereof) at most 5 times or 4 times said maximum distance.

In general, when viewing the rotational symmetry, the arrangement regions which may be provided should remain unconsidered, i.e. these regions do not break the symmetry. The same should of course apply to local elevations and depressions which can be used, for example, for marking the light-emitting means. In addition, the hollow body, as explained in detail below, may be assembled from a plurality of individually monolithic parts, and in this case the interfaces between these parts (an interface generally has an extent in the direction of the axis of rotation and perpendicular thereto) should also remain unconsidered in the considerations with respect to symmetry; the body of revolution can therefore be divided into segments.

Various embodiments relate to the arrangement of the LEDs such that, during operation, light is emitted with an angular distribution. In this case, the lighting unit is intended to emit light over an angular region, to be precise starting from a main axis of the illumination as 0° axis, up to angles of at least ±120°, e.g. at least ±130°, e.g. at least ±140°, i.e. the luminous intensity should be different from zero in a corresponding polar diagram in this angular region. In various embodiments, this applies in any desired sectional planes containing the main axis for the illumination, i.e. circumferentially. In the case of the outer surface based on the incandescent lamp bulb, the main axis of the illumination coincides with the axis of rotation.

The term "main axis" should not imply that the most light is emitted along this axis (i.e. the luminous intensity is at a maximum at 0°); a light-emitting means which maximizes an illumination towards the side (±90°) or even towards the rear (at even larger/smaller angles, for example in order to illuminate a reflector well, may also be of interest depending on the application. In various embodiments, the luminous intensity will have its maximum at 0° nevertheless.

In respect of a rotation about the main axis, the emission characteristic will generally not be symmetrical because the LEDs in one sense can represent light spots which are to a certain extent discretely distributed. In addition, the luminous intensity at positive angles and the luminous intensity at negative angles do not necessarily have a symmetrical profile with respect to one another in a polar diagram, i.e. when viewed in a sectional plane containing the main axis (in respect of reflection on the main axis), but this may be provided.

As already mentioned at the outset, in a configuration, driver and/or control electronics used for supplying power to or actuating the LEDs can be provided in the hollow body internal volume. This does not mean necessarily that all of the electronics need to be accommodated there, but it is also possible for only some of the electronics to protrude into the hollow body internal volume. Various embodiments do in general relate to a lighting unit which is equipped with a base, i.e. provided as light-emitting means (for insertion into a luminaire). In this case, the base, for example a screw-type base, can also have a certain internal volume, i.e. the electronics can then be arranged either in the base or in the hollow body internal volume.

In a configuration, the remaining hollow body internal volume can be filled with a filler material, which can provide effects in respect of protection of conductor track structure and electronics and also for thermal reasons.

A filled hollow body internal volume can generally be provided, i.e. even independently of driver/control electronics arranged therein, for example for protecting the conductor track structure or even also for thermal reasons. "Filled" therefore means filled at least to such an extent that the conductor track structure is covered by a continuous filler material extending through the hollow body internal volume; for example, the hollow body internal volume is completely filled.

In various embodiments, a hollow body is provided, which is open towards one side, and the filler material is introduced through this open end. In general, the filler material can be, for example, a potting material, for example a material based on polyurethane or silicone.

In a configuration, the hollow body is a part shaped by primary forming, i.e. a solid body which is produced from a material which was previously generally formless. In general, the hollow body could also be, for example, an extruded part, i.e. an above-described tubular hollow body could be extruded, for example.

In various embodiments, however, the hollow body is an injection-molded part. Even against this background, substantially smooth surfaces may be provided, i.e. apart from the preferred arrangement regions. "Injection-molded part" relates to a body which is released from a cavity which has previously been supplied with flowable material, at least within certain limits, which has been at least partially cured in the cavity. In various embodiments, this is supplied under elevated pressure, for example at at least 100 bar, 500 bar or 1000 bar; possible upper limits can be, for example, 3000 bar, 2500 bar or 2250 bar. The curing can take place, for example, at a curing temperature other than the supply temperature, in the case of a thermoplastic material, for example, at a lower temperature and, in the case of a thermosetting plastic material, for example, at a higher temperature.

In various embodiments, first a plurality of hollow body parts is produced, to be precise in each case individually in one mold, preferably in each case individually by injection molding, and the hollow body parts are then assembled to form the hollow body. In various embodiments, the hollow body is in two parts and two further e.g. identical hollow body halves are assembled; that is to say that, ideally, the entire hollow body can be realized using a single type of mold which gives a hollow body half.

Generally, the plurality of hollow body parts can be connected to one another at interfaces. In the case of an abovementioned rotational symmetry, an interface has an extent in the direction of the axis of rotation and perpendicular thereto; that is to say that each hollow body part then has two interfaces, based on a rotation about the axis of rotation, and adjoins at least one further hollow body part (in the case of a two-part hollow body, precisely one). The interfaces can divide the hollow body into segments, therefore.

With in each case one interface bearing against one another, two hollow body parts can be connected, for example, by a joining connection, for example by adhesive, or by plastic welding. In a configuration, an elevation can also be provided on one and a complementary depression provided in the other of two mutually assigned interfaces; a pin on one interface can therefore be plugged into a hole in the other, for example. In general terms, the hollow body parts can therefore also be held against one another by a form-fitting connection which goes beyond the interfaces merely bearing against one another, i.e. prevents a relative shift of the hollow body parts along the interfaces as well. A joining or plastic welding connection can additionally be provided.

In the exemplary production in a mold (e.g. by injection molding), the mold, i.e. the molding tool which delimits the cavity, may be provided such that through-holes in the plastics material are cleared at the points of the through-contacts, i.e. connecting holes between the inner and outer surfaces. In the further production, these holes are then filled with a metalloconductive material, e.g. with a metal.

The conductor track structure can in principle be applied, for example, as part of a multi-component injection-molding process, wherein the hollow body is injection-molded as one component, and, for example, a metallizable plastic is injection-molded as the other component, and this is then electroplated, for example. A carrier with the conductor track structure can also be inserted into an injection mold subjected to insert molding. In addition, the conductor track structure can also be stamped onto the previously injection-molded hollow body in a hot-stamping method, for example, starting from a metal film stamped at the same time in the stamping press.

In general, the conductor track structure can also be applied using methods known from semiconductor production, i.e. by corresponding masking, wherein, for example, the conductor track structure can be grown in exposed regions of a (resist) mask applied over a large area or a metal layer previously deposited (beneath the (resist) mask) can be removed, for example by etching.

It may be provided to apply the conductor track structure by laser direct structuring, wherein a laser beam on the surface of the (injection-molded or extruded) hollow body "writes" the conductor track structure and in the process exposes nuclei embedded in the hollow body for subsequent metallization. By the laser direct structuring, for example, a conductor track structure can also be defined easily on a curved region of the inner surface.

In general, for example, a copper or silver material may be provided for the conductor track structure, for example also a respective alloy which contains for the most part copper or silver. The conductor tracks may have, for example, a thickness of at least 3 μm, 5 μm, 8 μm or 10 μm and (independently of this) of at most 50 μm, 40 μm or 35 μm, when taken inwards away from the inner surface.

Figure 1:
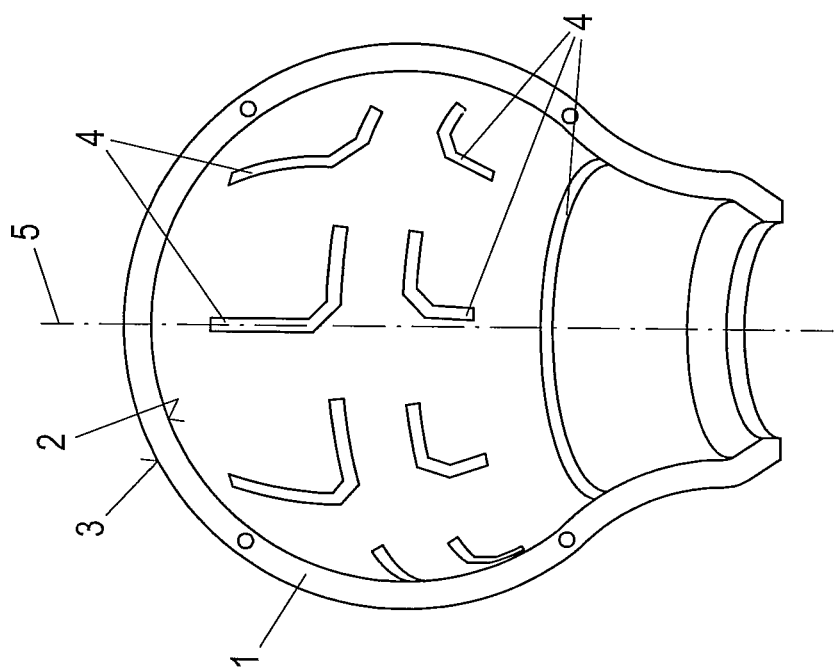
FIG. 1 shows a view of the inner surface of a hollow body half of a lighting unit according to various embodiments.

FIG. 1 shows one half of a hollow body 1 consisting of a plastics material, namely polyamide. The hollow body 1 has an inner surface 2 and an opposite outer surface 3. A conductor track structure 4 is arranged on the inner surface 2, i.e. conductor tracks made of copper are applied.

The conductor track structure 4 is used for making electrical contact with the LEDs 21 arranged on the outer surface 3, which LEDs can be seen in the view shown in FIG. 2, i.e. when looking onto the hollow body 1 from a direction opposite the viewing direction shown in FIG. 1.

Figure 3:
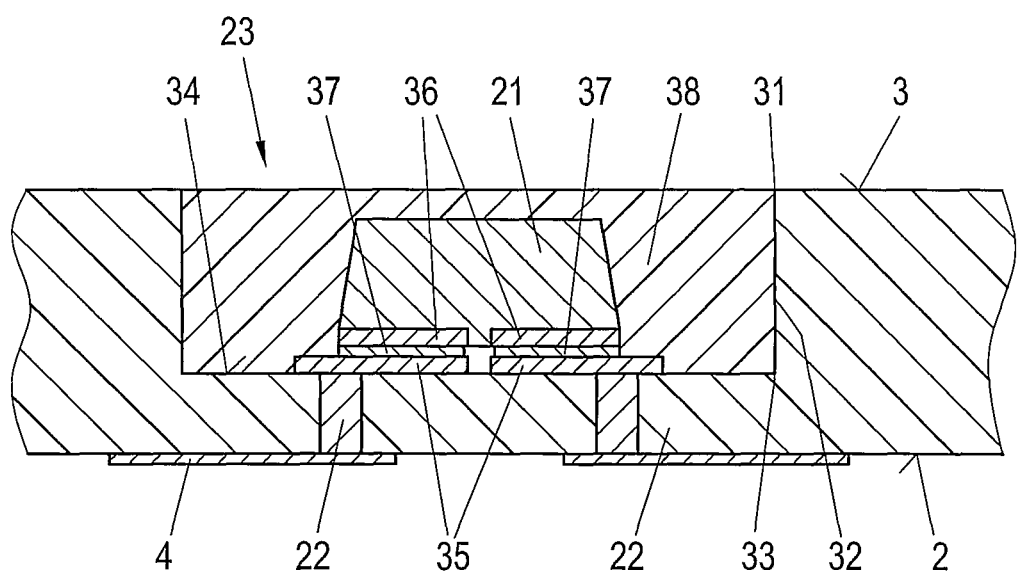
FIG. 3 shows a schematic section through an arrangement region of the hollow body half shown in FIG. 1 and FIG. 2 with an LED therein.

The LEDs 21 are provided as surface mounted devices and have in each case two connections on the reverse side, i.e. the side facing the hollow body 1, at which connections electrically conductive contact is made with said LEDs. The electrically conductive connection between the outer surface 3 and the inner surface 2 is produced in this case by through-contacts 22, i.e. through-holes filled with copper in the hollow body wall. The LEDs 21 are electrically conductively connected to the conductor track structure 4 via the through-contacts 22. FIG. 3 illustrates the connection of an LED 21 in detail (see below).

For reasons of clarity, in this case only the hollow body 1 with the conductor track structure 4 and the LEDs 21 is shown, i.e. a base (E27) of the light-emitting means which adjoins the open end is not illustrated. Via this base, the light-emitting means can be inserted, i.e. screwed, into a luminaire as replacement for a conventional incandescent lamp.

In order to operate the LEDs 21, in this case driver electronics are also required, namely for matching the mains voltage to the input voltage of the LEDs 21. These driver electronics are accommodated in the base, but extend into the hollow body 1. In order to protect the conductor track structure 4 and the driver electronics and for improved thermal connection, the remaining hollow body internal volume is filled with a filler compound, namely with silicone. None of this is illustrated for reasons of clarity.

The shape of the hollow body 1 is based on that of a conventional incandescent lamp. The outer surface 3 is rotationally symmetrical with respect to an axis of symmetry 5, apart from the arrangement regions 23, i.e. the depressions in which the LEDs 21 are arranged.

The arrangement regions 23 which are not taken into consideration when considering symmetry represent regions in which the outer surface 3 of the hollow body 1 is lowered such that, therefore, the LEDs 21 are also mounted correspondingly lowered.

FIG. 3 shows a schematic section through an LED 21 arranged in the arrangement region 23. The outer surface 3 falls away in the arrangement region from an upper edge 31 at a flank 32 to the lower edge 33 thereof and at the lower edge becomes a planar basic area 34 per se.

Two contact points 35 are metalized onto the basic area 34, to be precise in each case on one of the through-contacts 22.

The LED 21 is electrically conductively connected to the contact points 35 via its connection points 36 on the reverse side, namely via a respective solder layer 37. Each of the connection points 36 is therefore connected to in each case one contact point 35 via in each case one solder layer 37, wherein each of the contact points 35 is connected to the conductor track structure arranged on the inner surface 2 via in each case one through-contact 22.

The arrangement region 23 is generally filled with a filler material 38, namely silicone potting, in order to protect the connection points and the LED 21. Despite the local lowering of the outer surface 3 of the hollow body 1, a nevertheless smooth surface thus also results.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:
1. A lighting unit, comprising:
 a hollow body made of a plastics material as a substrate, which hollow body has an outer surface and an opposite inner surface, wherein the latter at least partially delimits a hollow body internal volume,
 a plurality of light emitting diodes, which are arranged on the outer surface of the hollow body, and
 a conductor track structure, which is electrically conductively connected to the light emitting diodes,
 wherein the conductor track structure is arranged on the inner surface of the hollow body, and the electrically conductive connection to the light emitting diodes is produced by through-contacts, which are passed through the plastics material;
 wherein a region of the outer surface is provided as arrangement region, which is inwardly lowered in comparison with a region of the outer surface which surrounds said arrangement region;
 wherein each of the plurality of light emitting diodes is arranged in an arrangement region; and
 wherein the outer surface, apart from the arrangement regions, is free of conductor tracks.

2. The lighting unit of claim 1,
wherein precisely one light emitting diode is arranged in the arrangement region.

3. The lighting unit of claim 1,
wherein at least one of the through-contacts, which produces the electrically conductive connection between the light emitting diode arranged in the arrangement region and the conductor track structure, is provided in the arrangement region.

4. The lighting unit of claim 1,
wherein the arrangement region is filled with a filler material in which the light emitting diode is embedded.

5. The lighting unit of claim 4,
wherein the outer surface including the arrangement region is flush.

6. The lighting unit of claim 1,
wherein particles are embedded in the plastics material, to be precise in order to increase at least one of the following: the thermal conductivity and the optical reflection properties of the hollow body.

7. The lighting unit of claim 1,
wherein the hollow body is rotationally symmetrical with respect to an axis of symmetry.

8. The lighting unit of claim 7,
wherein the outer surface has a shape which is based on that of an incandescent lamp bulb.

9. The lighting unit of claim 7,
wherein the hollow body, apart from arrangement regions, is rotationally symmetrical with respect to an axis of symmetry.

10. The lighting unit of claim 1,
wherein the light emitting diodes are arranged in such a way that, during operation, light is emitted with an angular distribution, to be precise in such a way that the lighting unit emits light starting from a main axis of the illumination as 0° axis, in any case up to angles of at least +/− 120°.

11. The lighting unit of claim 10,
wherein the light emitting diodes are arranged in such a way that, during operation, light is emitted with an angular distribution, to be precise in such a way that the lighting unit emits light starting from a main axis of the illumination as 0° axis, in any case up to angles of at least +/− 130°.

12. The lighting unit of claim 11,
wherein the light emitting diodes are arranged in such a way that, during operation, light is emitted with an angular distribution, to be precise in such a way that the lighting unit emits light starting from a main axis of the illumination as 0° axis, in any case up to angles of at least +/− 140°.

13. The lighting unit of claim 1,
wherein the hollow body internal volume is filled with a filler material.

14. A method for producing a lighting unit,
the lighting unit comprising:
a hollow body made of a plastics material as a substrate, which hollow body has an outer surface and an opposite inner surface, wherein the latter at least partially delimits a hollow body internal volume,
a plurality of light emitting diodes, which are arranged on the outer surface of the hollow body, and
a conductor track structure, which is electrically conductively connected to the light emitting diodes,
wherein the conductor track structure is arranged on the inner surface of the hollow body, and the electrically conductive connection to the light emitting diodes is produced by through-contacts, which are passed through the plastics material;
wherein a region of the outer surface is provided as arrangement region, which is inwardly lowered in comparison with a region of the outer surface which surrounds said arrangement region;
wherein each of the plurality of light emitting diodes is arranged in an arrangement region; and
wherein the outer surface, apart from the arrangement regions, is free of conductor tracks
the method comprising:
shaping the hollow body being a part shaped by primary forming.

15. The method of claim 14,
wherein the hollow body is produced by injection molding.

16. The method of claim 14,
wherein first a plurality of hollow body parts is produced, to be precise in each case individually in one mold, and the hollow body parts are then assembled to form the hollow body.

17. The method of claim 14,
wherein one of the hollow body as a whole and a plurality of hollow body parts is in each case produced individually in one mold, wherein the mold keeps through-holes in the plastics material clear at the points of the through-contacts, which through-holes are then filled with a metalloconductive material.

18. The method of claim 4,
wherein the conductor track structure is applied by laser direct structuring.

* * * * *

UNITED STATES PATENT AND TRADEMARK OFFICE
CERTIFICATE OF CORRECTION

PATENT NO. : 9,500,351 B2
APPLICATION NO. : 14/621410
DATED : November 22, 2016
INVENTOR(S) : Gertrud Kraeuter et al.

Page 1 of 1

It is certified that error appears in the above-identified patent and that said Letters Patent is hereby corrected as shown below:

In the Claims

Column 12, Line 47: Please delete "4" after the word "claim", and write "14," in place thereof.

Signed and Sealed this
Fourteenth Day of February, 2017

Michelle K. Lee
*Director of the United States Patent and Trademark Office*